(12) United States Patent
Koh (10) Patent No.: US 6,238,203 B1
(45) Date of Patent: May 29, 2001

(54) INJECTION NOZZLE FOR INJECTION MOLDING MACHINES

(75) Inventor: Jae-sik Koh, Ansan (KR)

(73) Assignee: Yudo Co., Ltd., Seoul (KR)

( * ) Notice: Subject to any disclaimer, the term of this patent is extended or adjusted under 35 U.S.C. 154(b) by 0 days.

(21) Appl. No.: 09/307,448

(22) Filed: May 10, 1999

(51) Int. Cl.⁷ .................................................. B29C 45/23
(52) U.S. Cl. ........................................... 425/562; 425/564
(58) Field of Search .................................... 425/562, 563, 425/564, 565, 566

(56) References Cited

U.S. PATENT DOCUMENTS 5,614,233 * 3/1997 Gellert ................................ 425/549
6,086,356 * 7/2000 Yu ....................................... 425/564

* cited by examiner

*Primary Examiner*—Tim Heitbrink
(74) *Attorney, Agent, or Firm*—Harrison & Egbert (57) ABSTRACT

An injection nozzle for injection molding machines with a valve system having a piston movably positioned around the top end portion of a nozzle body. A guide slot is formed at the top end portion of the nozzle body, and movably receives a pin actuating bar, integrated with a valve pin-of the valve system, and so the pin actuating bar is vertically and precisely movable under the guide of the guide slot. The valve pin is thus precisely movable in the nozzle body in a linear vertical direction without failure. The nozzle is also preferably used for producing large-scaled products or small-scaled products, thus have an improved compatibility. The nozzle is preferably used in a stack molding process. In addition, even when a manifold thermally expands due to a high temperature molten plastic material and is undesirably changed in position, the valve system is continuously operated without being stopped, thus allowing the injection molding process to be continued for a lengthy period of time.

2 Claims, 6 Drawing Sheets

INJECTION NOZZLE FOR INJECTION MOLDING MACHINES

BACKGROUND OF THE INVENTION

1. Field of the Invention

The present invention relates, in general, to a nozzle for injection molding machines used for injecting a molten plastic material into a cavity of molds during an injection molding process and, more particularly, to an injection nozzle having a guide slot at its top end portion and movably receiving a pin actuating bar, integrated with the valve pin of a valve system provided around the top end portion of the nozzle, in the guide slot, thus allowing a precise vertical movement of the valve pin in the nozzle and reducing the size of the nozzle, and almost completely preventing undesired malfunction or breakage of the valve pin.

2. Description of the Prior Art

As well known to those skilled in the art, in order to produce plastic products in large quantities using an injection molding machine, a molten plastic material is injected into a cavity of molds from an injection cylinder of the molding machine through both a manifold and a runner bush provided in a runner. After the plastic material, received in the cavity of the molds, is completely solidified into a plastic product, the molds are opened by a separate mold opening device, thus allowing the plastic product to be removed from the molds. The runner bush of a runner is typically and interiorly provided with a shut-up nozzle or an on/off nozzle for selectively closing the gate of the cavity, thus controlling an injection of molten plastic material into the cavity while selectively closing the gate of the cavity. However, when the gate of the cavity is closed by such a typical shut-up nozzle or a typical on/off nozzle, the molten plastic material, retained in a position around the gate, may fail to be completely solidified at a time a plastic product is removed from the molds. Such an incompletely solidified plastic material is thus taken out of the molds along with the plastic product when the product is removed from the molds. The incompletely solidified plastic material regrettably leaves a sprue or a slug on the plastic product and forces an additional process to be performed to remove such sprues from plastic products. This is inconvenient to users of injection molding machines and reduces the quality of injection molded plastic products.

In an effort to overcome the above problems, the inventor of this invention proposed valve systems for controlling the nozzles of injection molding machines in Korean U. M. Registration Nos. 96,556 and 116,226. The valve system, disclosed in the document of No. 96,556, is installed at a position above the manifold of a runner. The above valve system is designed to start to lower its valve pin so as to close the outlet end of an injection nozzle after a molten plastic material is completely injected into a cavity of molds. The valve system thus prevents a further injection of the molten plastic material from the injection nozzle into the cavity. In such a case, the lower end of the valve pin closes the outlet end of the injection nozzle, thus allowing the injection molded plastic products to be free from sprues. On the other hand, the valve system of No. 116,226 is designed to overcome problems experienced in the valve system of No. 96,556. In order to accomplish the above object, the valve system of No. 116,226 is installed at a side of the nozzle. The above valve system has a piston, while the injection nozzle has a valve pin with the valve pin being connected to the piston of the valve system using a linkage. When the piston of the valve system is moved in a vertical direction, the vertical moving action of the piston is transmitted to the valve pin through the linkage, thus allowing the valve pin to move in the same direction. The valve system of No. 96,556 is more preferably used with an injection molding machine capable of producing large-scaled plastic products or producing plastic products in large quantities. On the other hand, the valve system of No. 116,226 is more preferably used with a small-sized injection molding machine suitable for producing small-scaled plastic products.

However, the valve system of No. 96,556 is problematic in that a manifold has to extend between the valve system and the injection nozzle, thus inevitably having a long valve pin. Such a long valve pin enlarges the size of the manifold, thus requiring a large area for the manifold and finally enlarging the size of the molds. In addition, it is also necessary to always retain the molten phase of the plastic material in the manifold during an injection molding process. This forces a heater to be installed in the manifold so as to heat and melt the plastic material in the manifold. However, such a heater undesirably and thermally expands the manifold, thus undesirably changing the position of the manifold with both the valve system and the injection nozzle being retained at a fixed position. In such a case, the valve system cannot be operated, thus preventing an injection molding process from being continuously performed for a lengthy period of time. In addition, since the valve system and the injection nozzle are provided at both sides of the manifold, the plastic product removing direction from the molds is fixed to one direction. This forces a user of an injection molding machine to add another manifold when the user manufactures plastic products through a stack molding process wherein the plastic products have to be removed from the molds in opposite directions. Therefore, it is very difficult to use the above valve system in such a stack molding process. In addition, the valve system of No. 96,556 reduces productivity and work efficiency while producing plastic products through an injection molding process. On the other hand, the valve system of No. 116,226 is problematic in that it is installed at a side of the injection nozzle, thus being free from enlarging the size of the manifold different from the valve system of No. 96,556. However, this valve system is problematic in that it causes the size of the injection nozzle to be enlarged. In addition, since the valve pin is connected to the valve system through a linkage, it is somewhat difficult to stably and precisely move the valve pin in a vertical direction. Therefore, the valve pin may fail to precisely move in the vertical direction, thus reducing work efficiency during an injection molding process.

Since the valve system of No. 96,556 has a large size, thus being somewhat effectively used in producing a large-scaled plastic product which has to be molded using molds having a plurality of gates for the cavity. However, it is almost impossible to use the above valve system in producing small-scaled plastic materials. On the other hand, the valve system of No. 116,226 is somewhat preferably used in producing small-scaled plastic products or one plastic product. However, it is almost impossible to use this valve system in producing large-scaled plastic products or producing plastic materials in large quantities. Therefore, the two valve systems, disclosed in Korean U. M. Registration Nos. 96,556 and 116,226, force a user of an injection molding machine to have separate molding machines so as to manufacture plastic products regardless of sizes or quantities of resulting products. This is inconvenient to the users of the injection molding machines and reduces compatibility of the injection nozzles for the molding machines.

SUMMARY OF THE INVENTION

Accordingly, the present invention has been made keeping in mind the above problems occurring in the prior art, and an object of the present invention is to provide an injection nozzle for injection molding machines, which has a guide slot at the top end portion of its nozzle body and movably receives a pin actuating bar, integrated with a valve pin of a valve system provided around the top end portion of the nozzle body, in the guide slot, thus allowing a precise vertical movement of the valve pin in the nozzle body and reducing the size of the injection nozzle, and almost completely preventing undesired malfunction or breakage of the valve pin.

In order to accomplish the above object, the injection nozzle for injection molding machines according to the preferred embodiment of this invention comprises a valve system having a piston movably positioned around the top end portion of a nozzle body, and a guide slot formed at the top end portion of the nozzle body and movably receiving a pin actuating bar, integrated with a valve pin of the valve system, in the guide slot, thus allowing the pin actuating bar to be vertically and precisely movable under the guide of the guide slot and allowing the valve pin to be precisely movable in the nozzle body in a linear vertical direction without failure, and almost completely preventing undesired malfunction or breakage of the valve pin while reducing the size of the nozzle.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
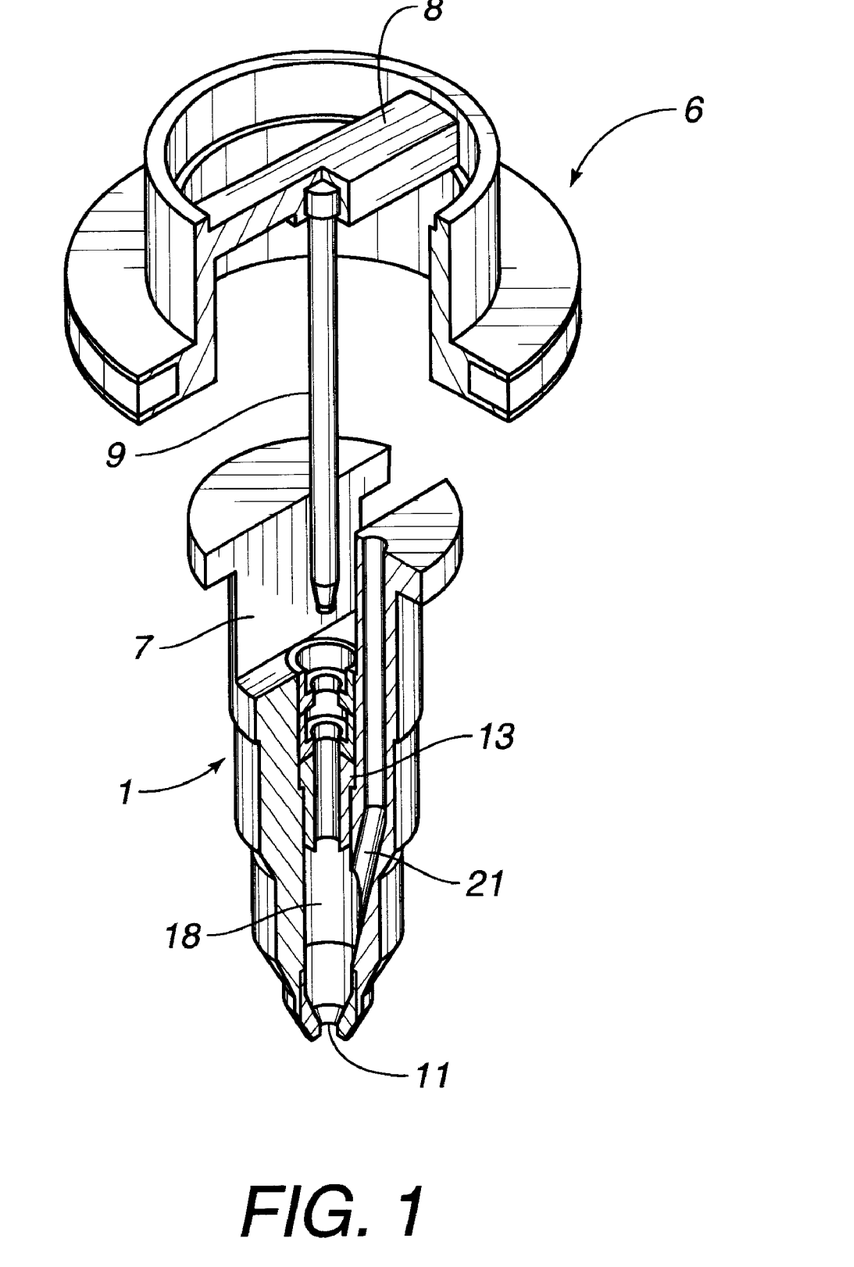
FIG. 1 is a partially broken exploded perspective view of an injection nozzle in accordance with the primary embodiment of the present invention, showing a nozzle body separated from a piston of a valve system.

The injection nozzle according to the primary embodiment will be described at first hereinbelow in conjunction with FIGS. 1 and 2.

The injection nozzle of this invention comprises two parts: a nozzle body 1 and a valve system 2. When a molten plastic material is injected from an injection cylinder of an injection molding machine into a manifold 4, the pressurized molten plastic material is introduced from the nozzle body 1 into a cavity 10 of molds 3. In such a case, the nozzle body 1 engages with the manifold 4. After the molten plastic material is completely injected into the cavity 10 of the molds 3, the valve system 2 starts to lower its piston 6 relative to the nozzle body 1 in a vertical direction, thus allowing a valve pin 9, assembled with and operated in conjunction with the piston 6, to close the outlet end 11 of the nozzle body 1. The above-mentioned relation between the nozzle body 1 and the valve system 2 of this invention remains the same as that described for the prior art.

The injection nozzle of this invention also has the following construction capable of accomplishing the objects of the present invention. That is, a cylindrical seat opening 17 is formed at a predetermined portion of the manifold 4 and orderly seats both the nozzle body 1 and the valve system 2 therein. In order to seat both the nozzle body 1 and the valve system 2 in the seat opening 17, a nozzle bush 14 is set in a nozzle seating portion of the seat opening 17 prior to inserting the nozzle body 1 downwardly into the nozzle bush 14 until the outlet end 11 of the nozzle body 1 reaches the cavity 10 of the molds 3. On the other hand, a guide slot 7 is axially formed at a top end portion of the nozzle body 1, while a longitudinal pin guide passage 18 is axially formed in the nozzle body 1 so as to allow the outlet end 11 of the nozzle body 1 to communicate with the guide slot 7 through the passage 18. A pin guide bush 13 is set in the upper portion of the passage 18. In addition, a piston bush 15 is set in the seat opening 17 of the manifold 4 in a way such that the interior surface of the piston bush 15 comes into contact with the external surface of the nozzle bush 14. The piston 6, having a flanged and hollow cylindrical configuration, is set in the seat opening 17 while being fitted over the piston bush 15 and receiving the upper portion of the nozzle body 1. The seat opening 17 thus acts as a piston cylinder 5 of the valve system 2. A pin actuating bar 8 integrally extends across the top portion of the hollow cylindrical piston 6. The above actuating bar 8 is movably received in the guide slot 7 of the nozzle body 1 when both the nozzle body 1 and the piston 6 are seated in the seat opening 17. The valve pin 9 is fixed to the center of the actuating bar 9 at its top end and linearly extends downwardly to a length. The above valve pin 9 is movably and axially inserted into the pin guide bush 13 of the nozzle body 1, thus selectively closing the outlet end 11 of the nozzle body 1 in accordance with a vertical movement of the piston 6. A cylinder cap 16 is fitted into the upper end portion of the seat opening 17 so as to prevent an unexpected removal of the piston 6 from the seat opening 17. The piston 6 of the valve system 2 is hydraulically or pneumatically moved relative to the nozzle body 1 in a vertical direction. The cylinder cap 16 is fitted onto the upper end portion of the seat opening 17. The cylinder cap 16 covers the seat opening 17 so as to prevent an unexpected removal of the piston 6 from the seat opening 17.

Figure 3:
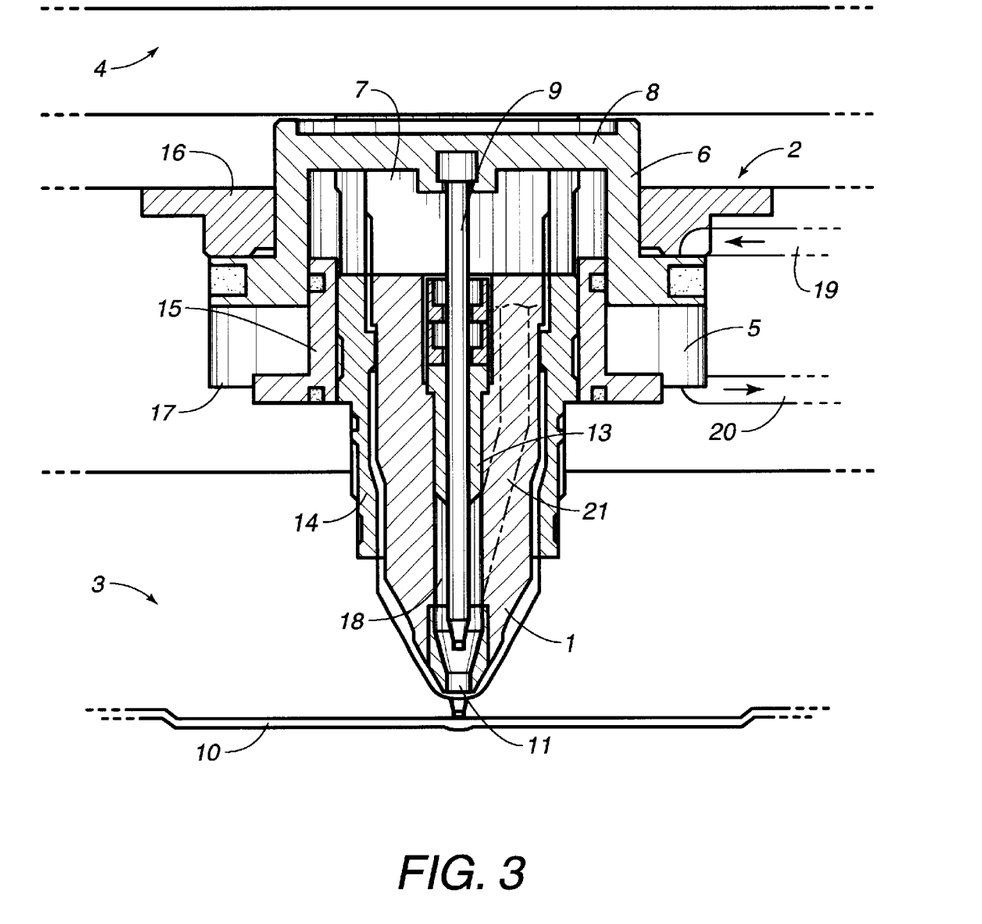
FIG. 3 is a sectional view of the above injection nozzle, showing the operation of the injection nozzle.

The cylinder cap 16 is fitted into the upper end portion of the seat opening 17 after piston 6 is inserted into seat opening 17. This forms a sealed space. The piston 6 moves in a vertical direction by hydraulic or pneumatic pressure which is provided through upper pressure hole 19 and lower pressure hole 20. When pressure is provided through the lower pressure hole 20, the pressure pushes the piston 6 upwardly through the guidance of piston bush 15 (as shown in FIG. 3). The actuating bar 8 moves up and down in the guide slot 7 of the nozzle body 1. The valve pin 9, fixed to the center of the actuating bar 8, moves upwardly and downwardly relative to the movement of the actuating bar 8.

In the drawings, the reference numerals 19 and 20 individually denote a pressure guide hole through which pressurized oil or air for the piston 6 passes. The numeral 21 denotes a plastic inlet hole formed in the nozzle body 1 so as to lead the pressurized and molten plastic material from an injection cylinder of an injection molding machine to the outlet end 11 of the nozzle body 1 prior to injecting the plastic material into the cavity 10.

The operational effect of the above injection nozzle will be described hereinbelow in conjunction with FIGS. 2 and 3.

The seat opening 17, formed at a predetermined portion of the manifold 4, has a plurality of steps capable of allowing both the nozzle body 1 and the valve system 2 to be stably seated in the opening 17 while being axially and concentrically aligned with each other. In order to set both the nozzle body 1 and the valve system 2 in the seat opening 17, the nozzle bush 14 is set in the nozzle seating portion of the seat opening 17 prior to inserting the nozzle body 1 downwardly into the nozzle bush 14 until the outlet end 11 of the nozzle body 1 reaches the cavity 10 of the molds 3. In addition, a pin guide bush 13 is set in the upper portion of the pin guide passage 18 of the nozzle body. On the other hand, the valve system 2 is set around the nozzle bush 14. In such a case, the piston bush 15 is set in the seat opening 17 in a way such that the interior surface of the piston bush 15 comes into contact with the external surface of the nozzle bush 14. Thereafter, the piston 6 is set in the seat opening 17 while being fitted over the piston bush 15 and receiving the upper portion of the nozzle body 1. The seat opening 17 thus acts as the piston cylinder 5 of the valve system 2. The cylinder cap 16 is fitted into the upper end portion of the seat opening 17 so as to prevent an unexpected removal of the piston 6 from the seat opening 17.

In the above injection nozzle, the guide slot 7 is axially formed at the top end portion of the nozzle body 1, while the pin actuating bar 8 integrally extends across the top portion of the hollow cylindrical piston 6. The above actuating bar 8 is movably received in the guide slot 7 of the nozzle body 1. On the other hand, the valve pin 9, fixed to the center of the actuating bar 8 at its top end, is movably and axially inserted into the pin guide bush 13 of the nozzle body 1, thus selectively closing the outlet end 11 of the nozzle body 1 in accordance with a vertical movement of the piston 6. That is, when the piston 6 of the valve system 2 is hydraulically or pneumatically moved relative to the nozzle body 1 in a vertical direction, the pin actuating bar 8 of the piston is moved in the same direction under the guide of the guide slot 7 of the nozzle body 1, thus moving the longitudinal valve pin 9 in the same direction in the pin guide passage 18 of the nozzle body 1.

Figure 2:
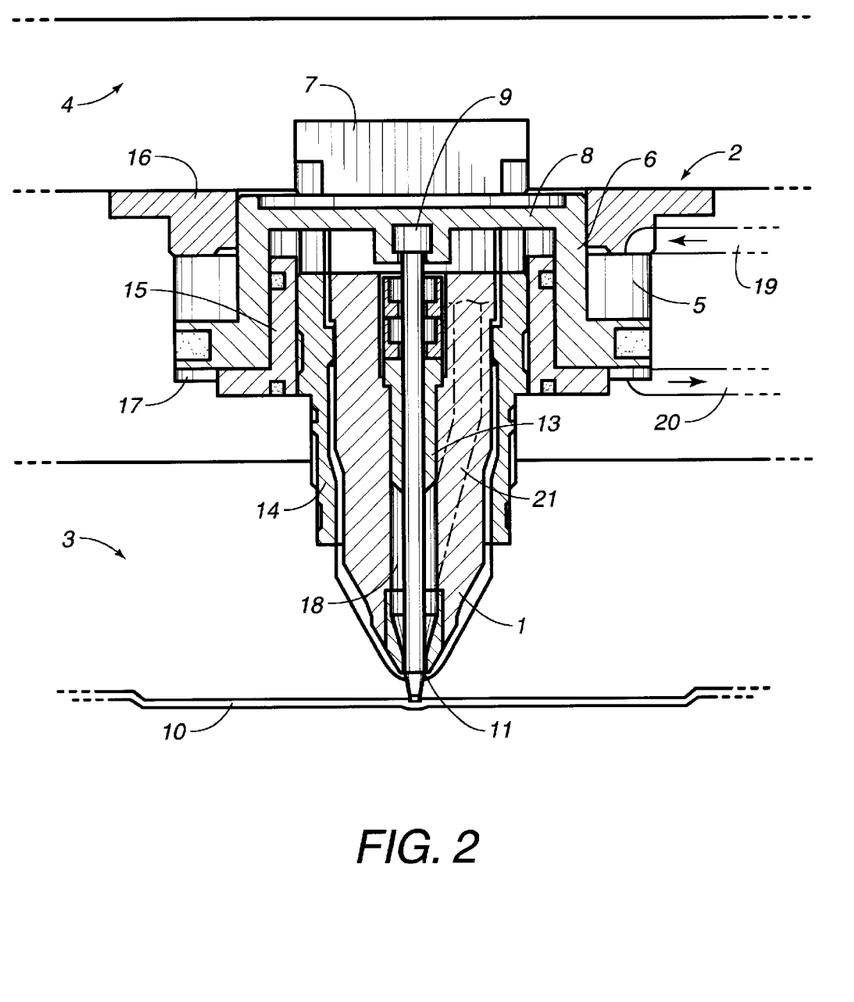
FIG. 2 is a sectional view, showing the above injection nozzle with the nozzle body being completely assembled with the piston of the valve system.

Therefore, in order to inject a molten plastic material into the cavity 10 of the molds 3, pressurized oil is applied to the lower portion of the cylinder 5 through the lower pressure hole 20 provided at a side of the valve system 2, thus raising the piston 6 in the seat opening 17, as shown in FIG. 2. In such a case, the valve pin 9 is moved upwardly in the passage 18, thus opening the outlet end 11 of the nozzle body 1. This allows the pressurized and molten plastic material to be led from the injection cylinder of the injection molding machine to the outlet end 11 of the nozzle body 1 through the plastic inlet hole 21. The pressurized and molten plastic material is thus injected into the cavity 10 of the molds 3 through the outlet end 11 of the nozzle body 1. When the cavity 10 is filled with the molten plastic material, pressurized oil is applied to the upper portion of the cylinder 5 through the upper pressure hole 19, while the existing pressurized oil is drained from the lower portion of the cylinder 5 through the lower pressure hole 20, thus lowering the piston 6 in the seat opening 17. In such a case, the valve pin 9 is moved downwardly in the passage 18, thus closing the outlet end 11 of the nozzle body 1 as shown in FIG. 3.

Therefore, the valve pin 9 thus prevents a further injection of the molten plastic material from the nozzle body 1 into the cavity 10.

After the plastic material, received in the cavity 10 of the molds 3, is completely solidified into a plastic product, the molds 3 are opened by a separate mold opening device, thus allowing the plastic product to be removed from the molds 3. After removing the plastic product from the molds 3, pressurized oil is applied to the lower portion of the cylinder 5 through the lower pressure hole 20, while the existing pressurized oil is drained from the upper portion of the cylinder 5 through the upper pressure hole 19, thus opening the outlet end 11 of the nozzle body 1. Thereafter, the above-mentioned process is repeated to form injection molded plastic products.

In a brief description, the valve pin 9, selectively closing the outlet end 11 of the nozzle body 1, is moved in a vertical direction in accordance with a vertical movement of the piston 6 of the valve system 2. In such a case, the piston 6 is vertically moved at a position around the top end portion of the nozzle body 1, while the pin guide bush 13, set in the pin guide passage 18 of the nozzle body 1, guides a linear vertical movement of the valve pin 9. Therefore, it is possible for the valve pin 9 to precisely and linearly move in the nozzle body 1 under the guide of the pin guide bush 13.

Figure 4:
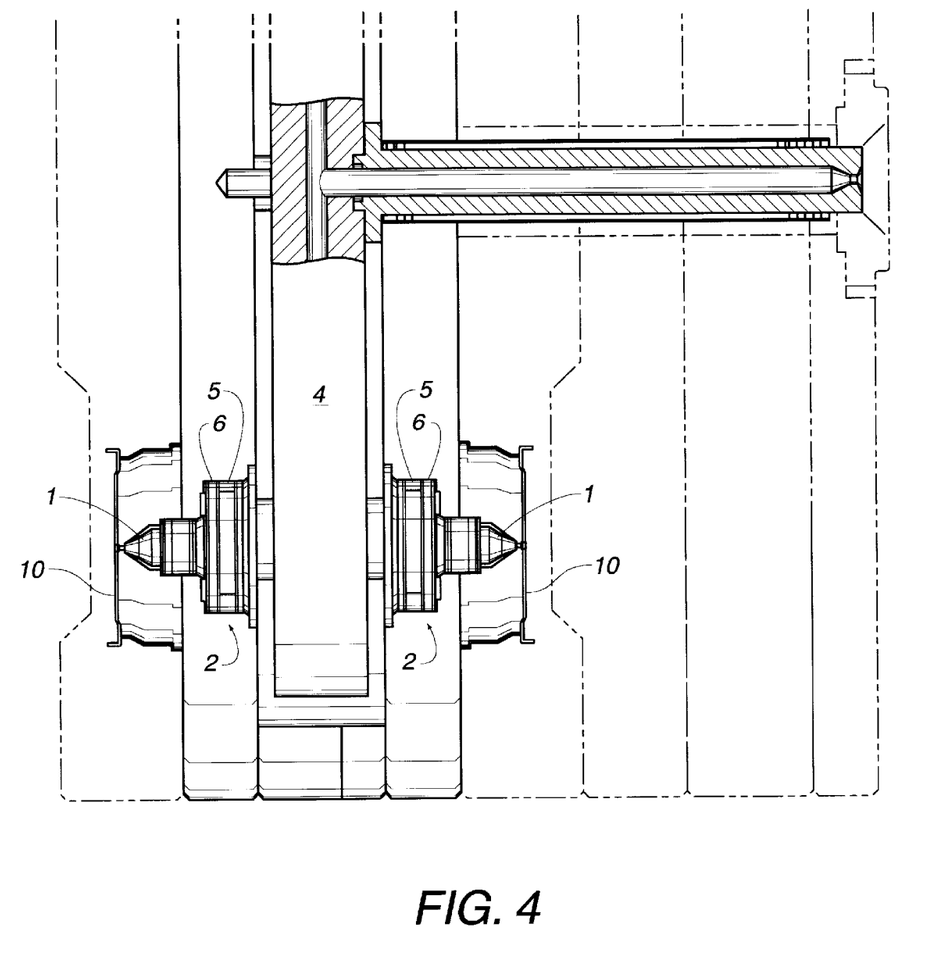
FIG. 4 is a view, showing two injection nozzles of this invention used in a stack molding process.

Since both the nozzle body 1 and the valve system 2 of the injection nozzle according to this invention are provided at a side of the manifold 4 while being assembled with each other, the injection nozzle may be effectively used in a stack molding process as shown in FIG. 4. In such a stack molding process, two nozzle bodies 1, individually assembled with a valve system 2, are provided at opposite sides of a manifold 4, thus injecting a molten plastic material into two cavities 10, positioned at opposite sides of the manifold 4, at the same time. In addition, when the manifold 4 thermally expands due to a high temperature molten plastic material, the position of the manifold 4 may be undesirably changed. However, in such a case, the position of the nozzle body 1 is retained at its fixed position, thus allowing the valve system 2 to be continuously operated without being stopped and thereby allowing an injection molding process to be continued for a lengthy period of time without being stopped.

Figure 5:
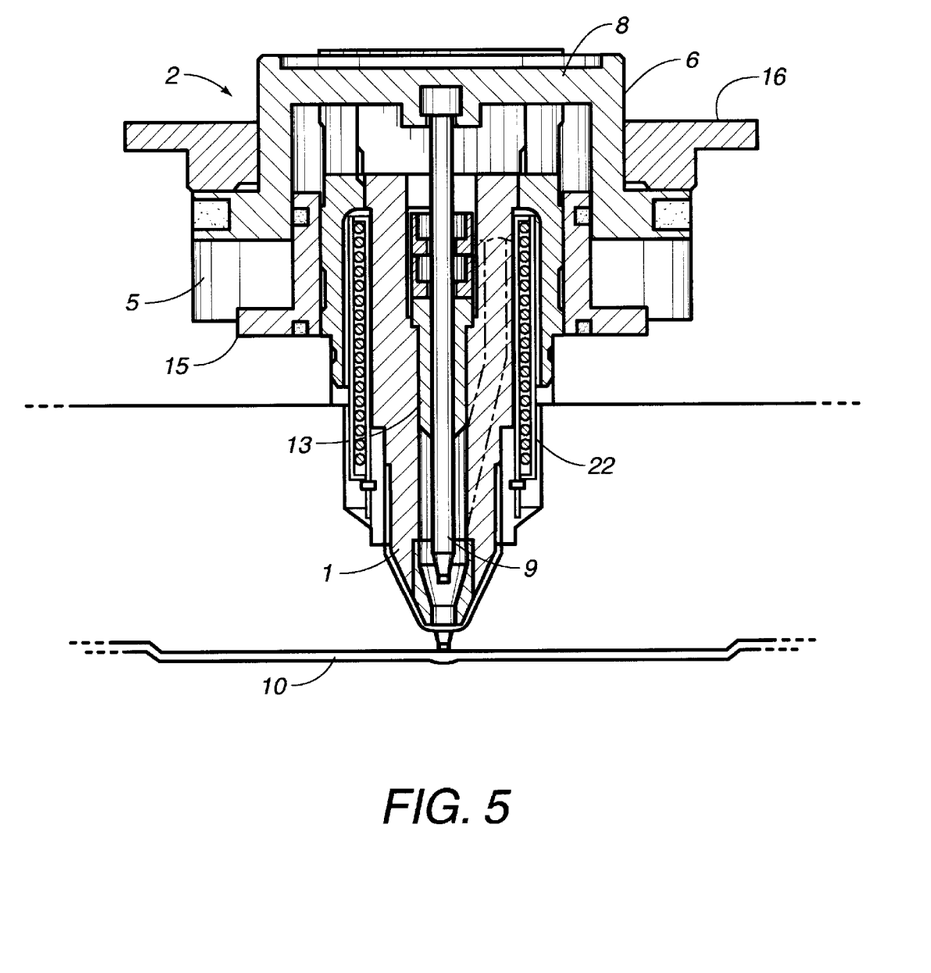
FIG. 5 is a sectional view, showing an injection nozzle in accordance with the second embodiment of the present invention.
Figure 6:
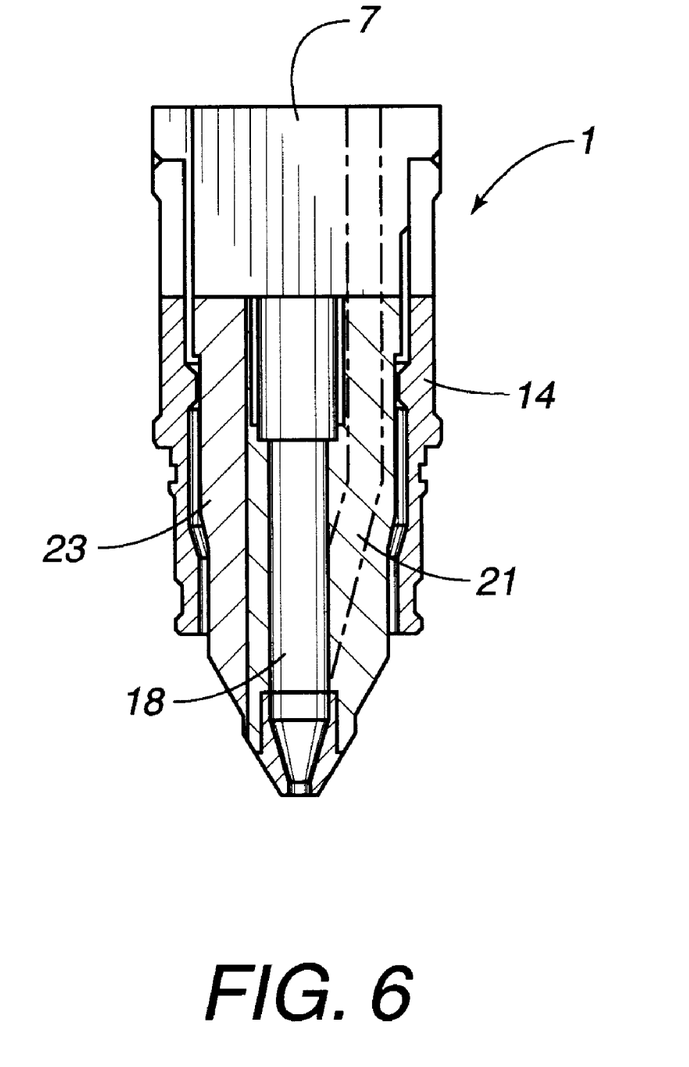
FIG. 6 is a sectional view, showing an injection nozzle in accordance with the third embodiment of the present invention.

In the case of producing a plastic product having projections at both sides thereof, this results in a somewhat long distance between the manifold 4 and the cavity 10 of molds 3 and forces the nozzle body 1 to be lengthened. In such a case, the molten plastic material may be undesirably solidified in the pin guide passage 18 of the nozzle body 1 when the plastic material is injected from the nozzle body 1 into the cavity 10. In order to overcome such a problem, a heater 22 may be installed at a position around the lower portion of the nozzle body 1 as shown in FIG. 5. During an injection molding process, the above heater 22 heats the nozzle body 1, thus preventing the molten plastic material from being undesirably solidified in the pin guide passage 18 of the nozzle body 1. In accordance with another embodiment of the present invention, a copper alloy part 23, having a high thermal conductivity suitable for retaining a desired temperature of the nozzle body 1, may be set in the nozzle body 1 as shown in FIG. 6. In such a case, it is preferable to form a plurality of holes on a nozzle material and to set a high thermal conductive copper alloy in each of the holes prior to machining the nozzle material during a nozzle producing process.

As described above, the present invention provides an injection nozzle for injection molding machines. In the injection nozzle of this invention, the valve system, used for selectively closing the outlet end of a nozzle body, is not spaced apart from the nozzle body, but is positioned approximate to the top end portion of the nozzle body. This invention thus reduces the size of a manifold. In addition, since the piston, vertically moving the valve pin of the valve system, is moved at a position approximate to the top end portion of the nozzle body, the injection nozzle of this invention almost completely prevents a malfunction of the valve pin, thus improving work efficiency and productivity during an injection molding process. The injection nozzle of this invention may be preferably used for producing a large-scaled product, needing a plurality of nozzles to be installed at a manifold, or a small-scaled product needing a single nozzle to be installed at a manifold. The injection nozzle of this invention thus has an improved compatibility. The injection nozzle is also used in a stack molding process, thus improving the quality of products from such a stack molding process. Another advantage of the above injection nozzle resides in that even when a manifold thermally expands due to a high temperature molten plastic material and is undesirably changed in position, the valve system is continuously operated without being stopped, thereby allowing the injection molding process to be continued for a lengthy period of time without being stopped.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An injection nozzle for injection molding machines, said nozzle being set in a manifold and adapted for injecting a molten plastic material from an injection cylinder of a molding machine into a cavity of molds, the injection nozzle comprising:

a seat opening formed on a predetermined portion of said manifold;

a nozzle body fixedly and vertically set in said seat opening until its outlet end reaches the cavity of the molds with a nozzle bush being interposed between an internal surface of said seat opening and an external surface of said nozzle body, said nozzle body being adapted for selectively injecting the molten plastic material from said outlet end into the cavity, and the nozzle body comprising:

a guide slot axially formed at a top end portion of said nozzle body;

a longitudinal pin guide passage axially formed in said nozzle body so as to allow said outlet end of the nozzle body to communicate with said guide slot through the pin guide passage; and a pin guide bush axially set in an upper portion of said pin guide passage; and a valve system set in said seat opening at a position around the top end portion of said nozzle body and adapted for selectively closing said outlet end of the nozzle body so as to stop an injection of the molten plastic material into the cavity, said valve system comprising:

a piston bush set in said seat opening with an interior surface of said piston bush coming into contact with an external surface of said nozzle bush;

a piston movably set in said seat opening in a way such that said piston is fitted over the piston bush and receives the top end portion of said nozzle body, thus being vertically movable relative to the nozzle body in a cylinder defined by the seat opening;

a pin actuating bar integrally extending across a top portion of said piston and movably seated in said guide slot of the nozzle body, thus being vertically movable relative to the guide slot in accordance with a vertical movement of said piston;

a valve pin linearly extending downwardly from a center of said pin actuating bar and movably and axially inserted into said pin guide bush of the nozzle body, thus selectively closing the outlet end of the nozzle body in accordance with a vertical movement of said pin actuating bar; and a cylinder cap fitted into an upper end portion of said seat opening, thus preventing an unexpected removal of the piston from said seat opening.

2. The injection nozzle according to claim 1, wherein said nozzle body has a copper alloy part having a high thermal conductivity, said copper alloy part being provided on the nozzle body by forming a plurality of holes on a nozzle material and setting a high thermal conductive copper alloy in each of said holes prior to machining the nozzle material during a nozzle producing process.

* * * * *